US008489752B2

(12) United States Patent
Kruger et al.

(10) Patent No.: US 8,489,752 B2
(45) Date of Patent: Jul. 16, 2013

(54) METHOD AND SYSTEM FOR CONTROLLING BUS ACCESS

(75) Inventors: Warren Kruger, Sunnyvale, CA (US); Zohair Hyder, Fremont, CA (US); Elene Terry, Los Altos, CA (US); Xidong Wang, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 499 days.

(21) Appl. No.: 12/475,134

(22) Filed: May 29, 2009

(65) Prior Publication Data

US 2009/0313323 A1 Dec. 17, 2009

Related U.S. Application Data

(60) Provisional application No. 61/071,990, filed on May 29, 2008.

(51) Int. Cl.
*G06F 15/16* (2006.01)

(52) U.S. Cl.
USPC ........... 709/229; 709/203; 709/232; 709/105; 455/500; 455/517; 370/400; 370/449

(58) Field of Classification Search
USPC ... 709/229, 232, 105; 455/500, 517; 370/400, 370/449
See application file for complete search history.

(56) References Cited

U.S. PATENT DOCUMENTS

| | | | |
|---|---|---|---|
| 2001/0018701 A1* | 8/2001 | LiVecchi | 709/105 |
| 2003/0031185 A1* | 2/2003 | Kikuchi et al. | 370/400 |
| 2003/0222819 A1* | 12/2003 | Karr et al. | 342/457 |
| 2004/0093422 A1* | 5/2004 | Umayabashi et al. | 709/232 |
| 2004/0130488 A1* | 7/2004 | De Champlain | 342/374 |
| 2005/0013316 A1* | 1/2005 | Liao et al. | 370/449 |
| 2005/0281240 A1* | 12/2005 | Oh et al. | 370/343 |
| 2006/0025158 A1* | 2/2006 | Leblanc et al. | 455/456.2 |
| 2006/0079257 A1* | 4/2006 | Iochi et al. | 455/517 |
| 2006/0189334 A1* | 8/2006 | Wakabayashi | 455/500 |
| 2007/0249360 A1* | 10/2007 | Das et al. | 455/450 |
| 2009/0125632 A1* | 5/2009 | Purpura | 709/229 |
| 2010/0020722 A1* | 1/2010 | Farkas et al. | 370/254 |

* cited by examiner

*Primary Examiner* — Thuong Nguyen
(74) *Attorney, Agent, or Firm* — Sterne, Kessler, Goldstein & Fox P.L.L.C.

(57) ABSTRACT

A system and method for controlling communications between a plurality of clients and a central component. An embodiment of the invention includes one or more buses that connect the clients and the central component. This embodiment also includes a control module that is configured to receive ASK messages from the clients and issue GO commands to the clients. Each ASK message represents a request from a client to access the central component. Each GO command to the client represents permission for that client to access the central component. The control module comprises delay stages that delay the GO command. The delays may be different from client to client. The number of delay stages is chosen so that for all clients, the delay between the issuance of a GO command and the receipt at the central component of communications from the clients is the same.

10 Claims, 5 Drawing Sheets

METHOD AND SYSTEM FOR CONTROLLING BUS ACCESS

CROSS REFERENCE TO RELATED APPLICATIONS

The present application claims the benefit of U.S. Provisional Patent Application No. 61/071,990, filed on May 29, 2008, entitled "Method and System for Controlling Bus Access", which is incorporated herein by reference in its entirety.

BACKGROUND OF THE INVENTION

1. Field of the Invention

The invention described herein relates to communication between clients and a single component or resource.

2. Background Art

In digital circuit design, it is a common problem to have a single component that must be accessed by a number of clients. For example, a single memory device, such as a dynamic random access memory (DRAM), may provide memory resources for a number of clients. If the clients are not readily scheduled, or activity between clients and the single component is not otherwise controlled, then access to the component can be hampered by contention problems.

A number of solutions can be used to provide access to a single component, but many have shortcomings. To allow several clients to communicate with a single component, each client may be given its own physical channel to the single component. This might entail separate wiring between each client and the single component. This, however, represents an expensive solution. If implemented on an integrated circuit or in a printed circuit board, this requires significant area. Nor does this solve the problem of contention. Even if each client has its own physical channel to the single component, problems can arise when more than one client needs to access the component more or less simultaneously.

Another solution would be the use of a bus. Here, each client would need connectivity to the bus. Likewise, the single component would be connected to the bus. This addresses the problem of excessive wiring. The bus, however, now represents another resource, access which must be managed. Contention problems can arise when one or more clients seek to access the bus at the same time. Allocation of access to the bus can be managed through any of several well known algorithms. Access by clients to the bus may be based, for example, on a round robin process. Such algorithms, however, can be inflexible. There may be situations where one client has no need for the bus, while another client needs a large amount of bandwidth. Such conditions are not readily handled by a traditional bandwidth allocation processes. As a result, communications through a bus can be slow and inflexible. Moreover, the bus must be engineered to allow for the maximum amount of demand that the designer can envision. This allows the bus to service peak demands. Often, however, peak demand is not typical. More often, the requirements on the bus are well below the peak level. As a result, bus capacity will be wasted most of the time.

Another method for addressing the problem of providing access to a single component from multiple clients is the use of a daisy chain protocol. Here, given a number of clients that need to access a component, arbitration is provided to decide the client that will ultimately be given access to the component. A first and second client may need to access the component, in which case arbitration will decide which of the two clients remains in contention for the component. The winner among those two clients is then placed in competition with a third contending client. Arbitration is then provided between the third client and the survivor of the first arbitration. Again, a single surviving will be chosen. This survivor will then be put in contention with a fourth client. Again arbitration will be provided. This process is continued so that all clients are given an opportunity to contend for the access to the component.

Such a protocol, however, requires significant overhead. For example, in a situation where each client is seeking to store data at the single component, there needs to be space for temporary storage, while the data is stalled during arbitration. Moreover, there are issues as to the fairness of the outcome. At any given decision point in the process, for example, it is not known what requests from clients have been handled through arbitration previously, and what needs are yet to be considered later in the process. The process is essentially ignorant of past and future needs. This could be handled by reserving a time slot isochronously, but in the event that such a reserved slot is never used, the reservation represents a waste of bandwidth. This leads to lost efficiency.

There is a need, therefore, for a system and method that allows a number of clients to access a single component in such a way that minimizes wiring cost, and allows for fair and flexible access to the component.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention described herein includes a system and method for controlling communications between a plurality of clients and a central component. An embodiment of the invention includes one or more buses that connect the clients and the central component. This embodiment also includes a control module that is configured to receive ASK messages from the clients and issue GO commands to the clients. Each ASK message represents a request from a client to access the central component. Each GO command to the client represents permission for that client to access the central component. The control module comprises delay stages that delay the GO command. The delays may be different from client to client. The number of delay stages is chosen so that for all clients, the delay between the issuance of a GO command and the receipt at the central component of communications from the clients is the same.

Note that the concepts of the invention described herein can be applied in a number of settings. Generally, the invention addresses the problem in which multiple clients need to access a single component. This problem may exist, for example, on a single integrated circuit. Moreover, this problem may occur on a printed circuit board, or on a back plane. In any of these settings, the concepts of this invention can be used to address the problem of providing access to multiple clients, all of whom may need to access a single component.

Figure 1:
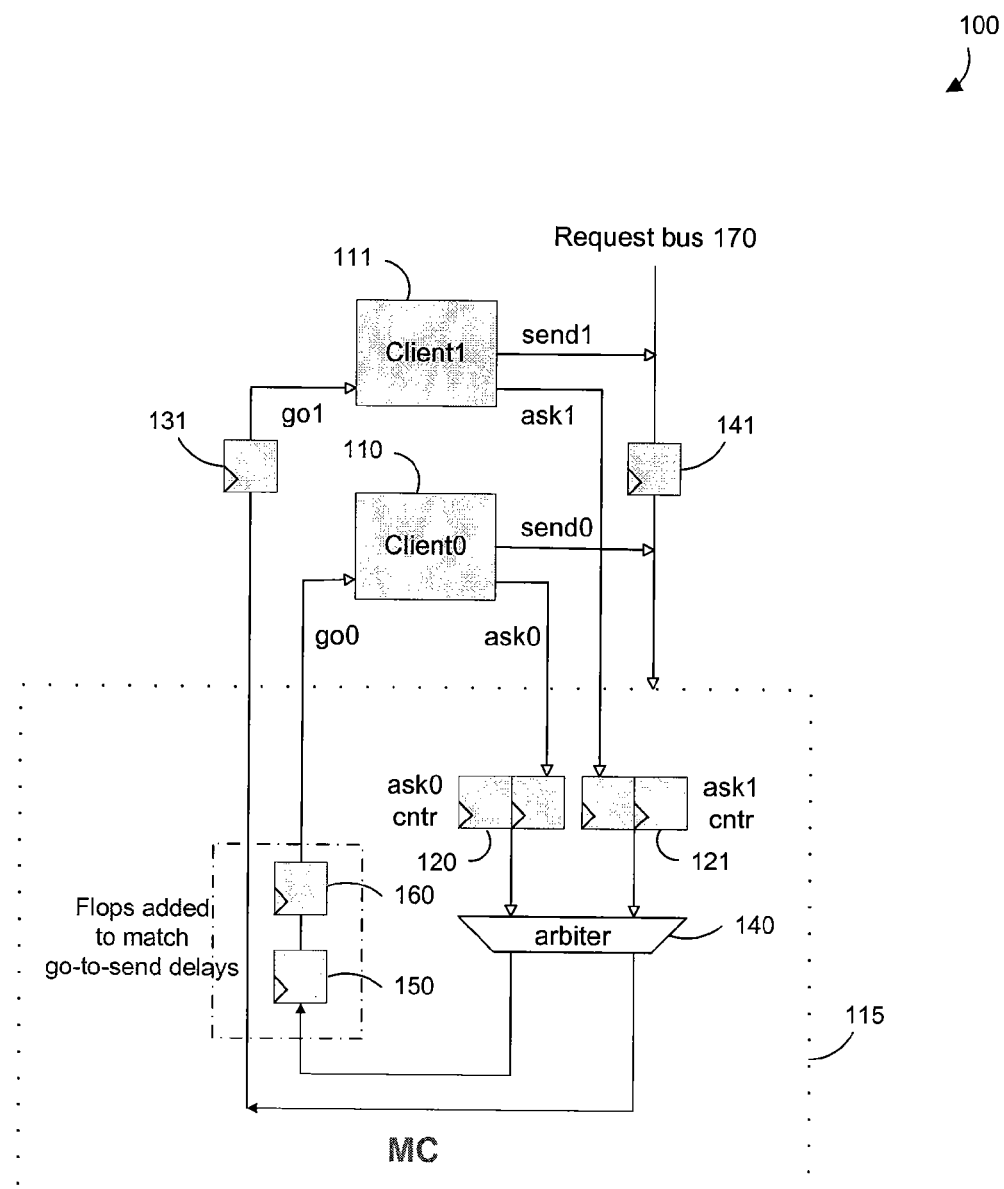
FIG. 1 is a block diagram illustrating the structure of an embodiment of the invention.

FIG. 1 is a block diagram illustrating an embodiment of the system of the invention. In FIG. 1, two clients are shown, client 110 and client 111. Both clients require access to a single component (not shown). Both clients are also in communication with a control module 115. In the illustrated embodiment, the clients need access to a single component represented by a memory device, such as a DRAM. The control module 115 is therefore shown as a memory controller ("MC"). When either of clients 110 or 111 needs to access the memory device, respective ASK messages are sent to control module 115. The ASK messages are registered with respective counters 120 and 121. The role of these counters will be described in greater detail below. The ASK messages are then forwarded to an arbiter 140. Arbiter 140 then issues respective GO commands to clients 110 and 111. Each GO command serves to grant permission to the respective client to send information to the memory device. Arbiter 140 selects which client is to receive permission at any particular time. The respective GO messages can therefore be sent at different times, depending on the decision of the arbiter 140.

Note that with respect to client 111, the path of the GO command from control module 115 to this client includes a delay stage 131. Moreover, when client 111 transmits information to the memory device, this takes the form of a SEND message, which encounters a delay stage 141. Hence, there are two delays that occur between the issuance of a GO command to client 111 and the receipt, at the memory device, of a corresponding SEND message. Generally, each client may have a different number of delays in the loop between issuance of a GO command to the client and the receipt, at the memory device, of a corresponding SEND message. This complicates the problem of arbitration. In particular, GO messages sent to different clients at different times may arrive at the single component at the same time, creating a contention issue.

To resolve this problem, additional delay stages can be added to the loops of some of the clients. Generally, if delays are added to the loop of each client, such that each loop consequently has the same amount of total delay, the decision is simplified as to when to issue GO commands for different clients. If a GO command is then issued to a first client at time slot n, and a GO command is issued to a second client at timeslot n+1, it is assured that the SEND commands of these clients will arrive at the single component at successive time slots. Contention is thereby avoided.

In the embodiment of FIG. 1, the added delays are shown as flip-flops 150 and 160. By adding two delays to the loop of client 110, this loop now has the same number of delays as the loop of client 111.

The above embodiment shows two clients. In a real world application, an arbitrary number of clients can be handled, given the concept shown in FIG. 1. According to a process to be described below, initially (before the addition of any delays) the maximum delay is determined, among all clients, between the time of issuance of a GO command and the receipt at the memory device of a SEND message. This represents the longest preexisting loop, of all the clients, between issuance of a GO command and receipt at the memory device of the SEND message. One or more clients will have such a maximum delay. The loops corresponding to the other clients are then modified as necessary to include additional delays. For each of the other clients and their loops, the added delays adjust the total delay for the respective client to equal the maximum delay.

Note also that the SEND messages are shown being sent through a single request bus 170. Alternative embodiments of the invention may use other communications topologies to connect clients and the single component. For example, there may be more than one bus. SEND messages may be conveyed to the single component through a plurality of buses organized as a tree, or as a daisy chain. Moreover, such buses may be organized as a tree of daisy chains, or a daisy chain of trees, etc. Any such arrangement of buses is referred to herein as a bus system. A bus system, therefore, refers to any of several arrangements of buses, including a single bus, or any combination of two or more buses. In alternative embodiments, the communications topology between clients and the single component includes a point-to-point topology.

Figure 2:
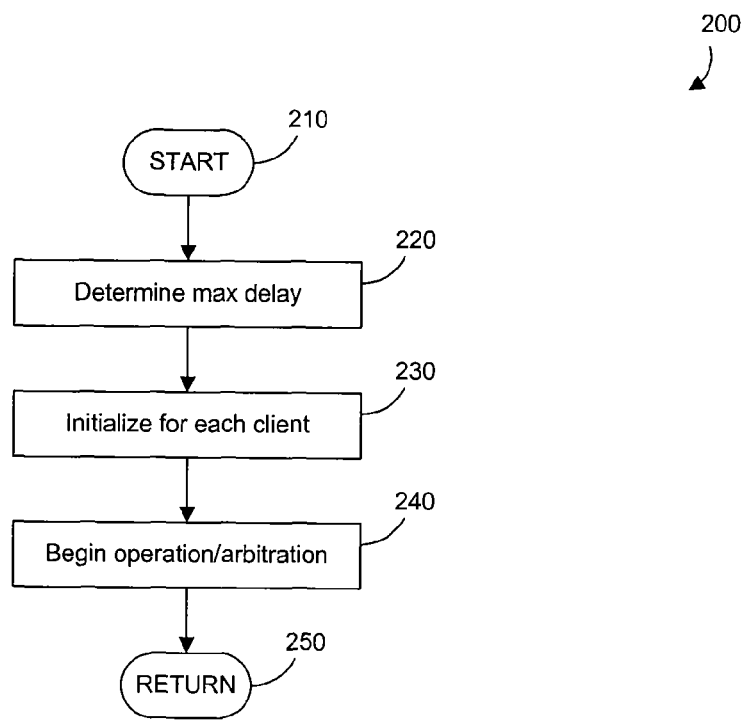
FIG. 2 is a flowchart illustrating the overall processing of an embodiment of the invention.

FIG. 2 illustrates the overall processing of the invention. The process begins at step 210. In step 220, the maximum delay is determined. As described above, the maximum delay results from considering all of the clients, and the time delay involved for each client between issuance of a GO command to the client and the receipt of a SEND message from the client at the memory device or other single component. The client having the longest delay is said to have the maximum delay. In step 230, initialization is performed for each client. This step will be described in greater detail below.

Initialization includes the addition of delays to the path between an arbiter and the client. As described above, such delays are added to create a total delay for each client, where the total delay equals the maximum delay.

In step 240, the actual operation (the sending of ASK messages by clients, arbitration at the control module, issuance of GO commands back to the clients, communication of SEND messages, etc.) proceeds. The process concludes at step 250.

Figure 3:
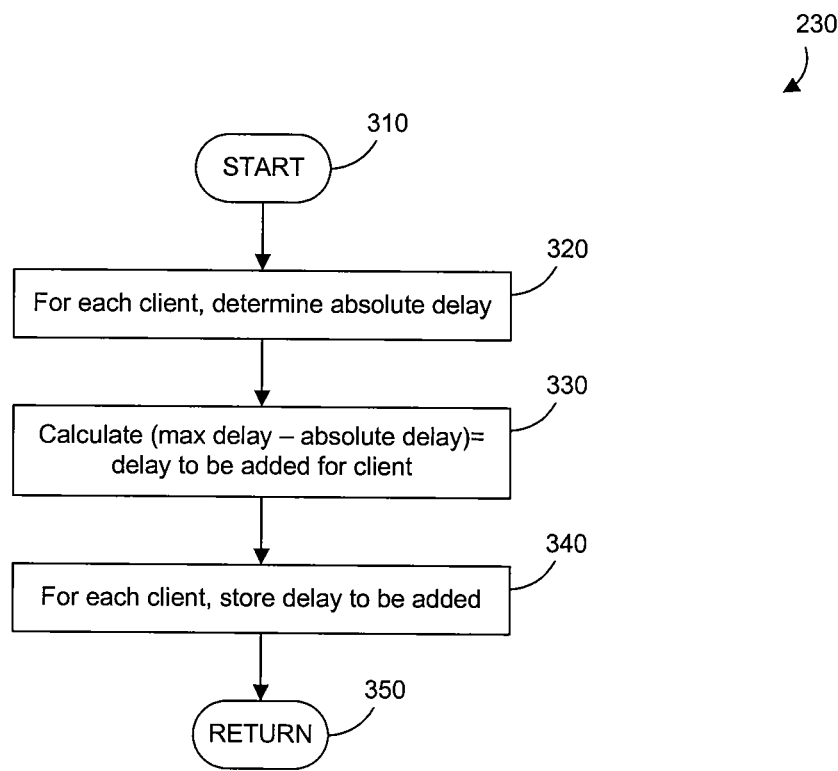
FIG. 3 is a flowchart illustrating initialization of the process of the invention, according to an embodiment thereof.

FIG. 3 illustrates an embodiment of the initialization step 230. The process begins at step 310. In step 320, the absolute delay is determined for each client. This represents the time between issuance of a GO command to the client and the receipt at the single component of a SEND message from the client. In step 330, for each client the difference between the maximum delay and the client's absolute delay is determined. This difference represents the delay that is to be added for the client. In step 340, this delay to be added is stored for each client, and implemented. The process ends at step 350.

Figure 4:
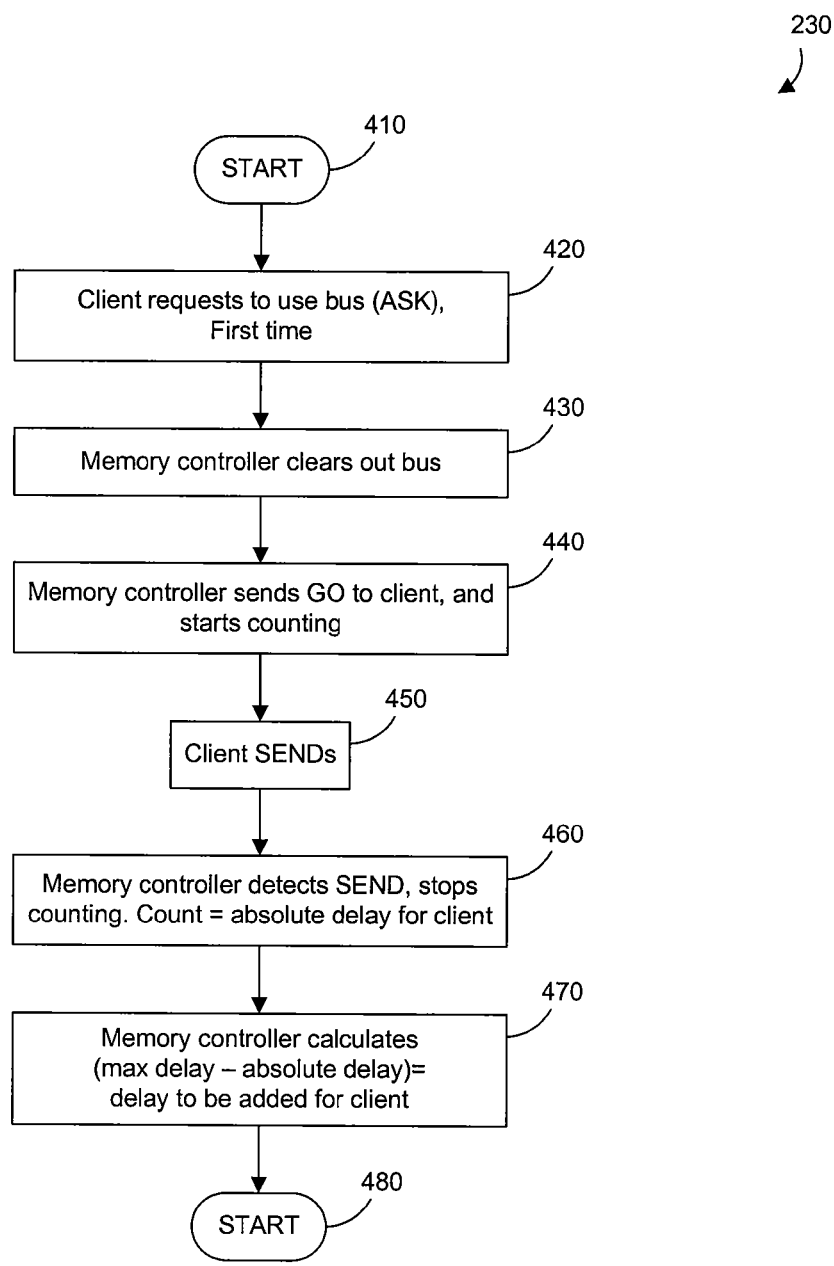
FIG. 4 is a flowchart illustrating an alternative embodiment of the initialization process.

FIG. 4 illustrates an alternative embodiment for initialization step 230. The process begins at step 410. In step 420, a client requests to use the bus, i.e., sends an ASK message, for the first time. In step 430, the control module clears out the bus. This serves to avoid contention problems during initialization. In step 440, the control module sends a GO message to the client and at the same time starts a counter. In step 450, the client transmits a SEND message. In step 460, the control module detects when the SEND message reaches the single component, and stops the counter at this point. The value in the counter therefore represents the absolute delay for this client. In step 470, the memory controller calculates the difference between the maximum delay and the absolute delay for this client. As described above, this difference represents the delay to be added to the loop for this client. The process concludes at step 480. The steps of FIG. 4 are repeated for each client that seeks to use the single component.

In other embodiments of the invention, alternative mechanisms can be used to detect and measure the delay in the communications topology between the client and the single component. If the communications topology includes a bus, for example, the spine of the bus may include branch nodes that perform switching and power management functions. In addition, these branch nodes may facilitate the process of measuring the delay between the client and the single component, as follows.

In an embodiment of the invention, one or more branch nodes sends an ASK message to the control module. The arbiter in the control module responds by sending out a GO command to the branch node(s). The branch node then sends out a dummy transmission over the communications topology. When the dummy transmission is received at the control module, the transit time required for the dummy transmission is noted. This information can then be used to calculate the maximum delay and/or the absolute delay for a client.

In an alternative embodiment of the invention, a maximum delay is not calculated per se. Rather, an arbitrary value is chosen or predefined, where this predefined value is known to be greater than or equal to the maximum delay. Delays are then added for each client's path, so that each client has the same delay, i.e., the predefined delay.

Figure 5:
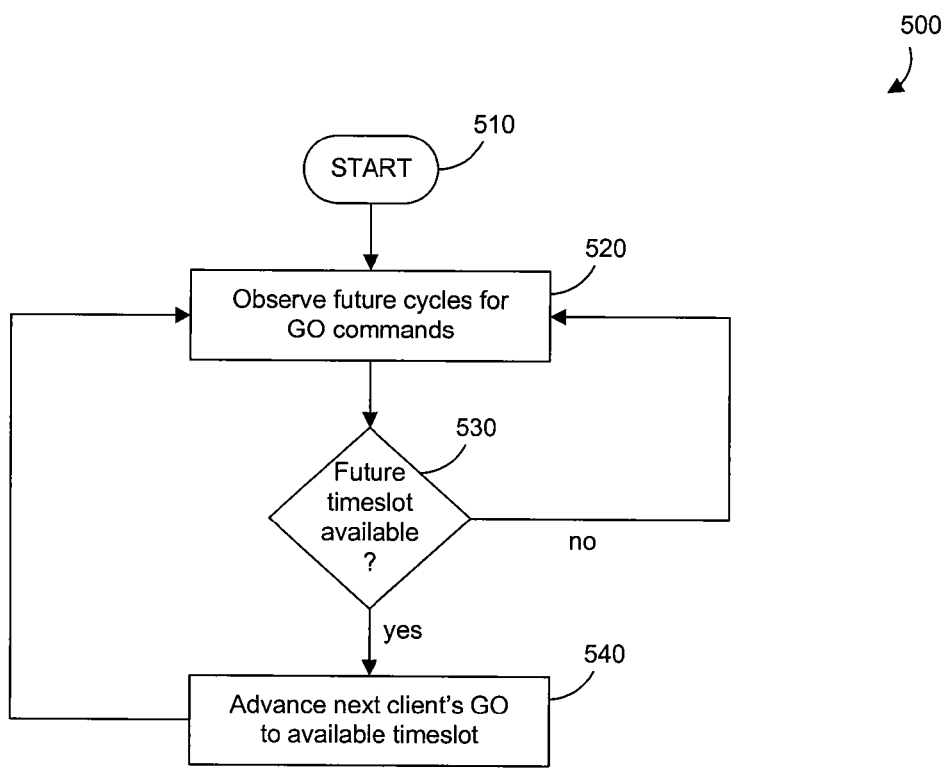
FIG. 5 is a flowchart illustrating an embodiment of the invention in which clients contending for access to the component can take advantage of available bandwidth.

FIG. 5 illustrates a process through which a client can take advantage of the fact that another client may be idle. The process begins at step 510. In step 520, future time slots in which GO commands can be issued are monitored at the control module. In this step, therefore, the control device becomes aware of any future time slots that are not allocated for the issuance of GO commands. In step 530, a determination is made as to whether such future time slots are available. If so, then a client's GO command (that may have been scheduled for a later time slot) is advanced to the available time slot. This allows another client (e.g., the next client that would normally be issued a GO command after the vacant time slot) to take advantage of the vacant time slot. The process then returns to step 520. If, in step 530, no future time slots are available, then the process returns to step 520.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. For example, various aspects of the present invention can be implemented by software, firmware, hardware (or hardware represented by software such, as for example, Verilog or hardware description language instructions), or a combination thereof. Exemplary system 100 in which the present invention, or portions thereof, can be implemented as computer-readable code. After reading this description, it will become apparent to a person skilled in the relevant art how to implement the invention using other computer systems and/or computer architectures.

Any apparatus or manufacture comprising a computer useable or readable medium having control logic (software) stored therein is referred to herein as a computer program product. It should be noted that the operation, simulation, synthesis and/or manufacture of the various embodiments of this invention may be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM). Control logic can also be embodied as a computer data signal embodied in a computer usable (e.g., readable) transmission medium (such as a carrier wave or any other medium including digital, optical, or analog-based medium). As such, the control logic can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for controlling communications between clients and a controller component in a circuit, comprising:

determining a first delay value for each of the clients, the first delay value being based on a delay between issuance of a command permitting access to send a message to the controller component and receipt of the message at the controller component;

identifying a maximum delay value among the first delay values;

calculating a second delay value for each of the clients not exhibiting the maximum delay, wherein the second delay value is determined by the difference between the maximum delay value and the client's respective first delay value; and inserting the respective second delay value into the determined first delay value for each of the clients not exhibiting the maximum delay value to equalize an overall delay value associated with each of the clients to the maximum delay value.

2. The method of claim 1, wherein, for each of the clients, said determining, identifying, and calculating comprises:
receiving a request message from the client, to access the controller component;
clearing out a communications topology that connects the client with the controller component;
sending the command to the client to send a message to the controller component and simultaneously starting a counter;
stopping the counter when communication from the client has reached the controller component; and
determining a difference between the maximum delay and the counter, wherein the difference is the second delay value to be added.

3. The method of claim 2, wherein said communications topology comprises a bus system of one or more buses.

4. The method of claim 3, wherein said bus system comprises a daisy chain of buses.

5. The method of claim 2, wherein said communications topology comprises a point-to-point connection between one of the clients and the controller component.

6. The method of claim 3, wherein said bus system comprises a tree structure of buses.

7. The method of claim 1, wherein the determining comprises:
receiving a request message from a branch node at a control module;
sending the command to the client to send the message to the controller component corresponding to the request message;
receiving a dummy transmission from the branch node at the control module; and
determining the maximum delay based on a transit time of said dummy transmission.

8. The method of claim 1, wherein the controller component comprises a memory device.

9. The method of claim 1, wherein the clients comprises at least one of:
(a) a color buffer;
(b) a depth buffer;
(c) a texture cache;
(d) a multimedia client; and
(e) a display.

10. The method of claim 1, further comprising:
observing future time slots that can be used for issuance of future commands to clients to send the message to the controller component, to see if any future time slot is available; and
if so, advancing a next client to the available time slot.

* * * * *